United States Patent
Tran (10) Patent No.: US 10,429,051 B1
(45) Date of Patent: *Oct. 1, 2019

(54) LIFI COMMUNICATION SYSTEM

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,149

(22) Filed: Dec. 2, 2018

(51) Int. Cl.
| | |
|---|---|
| *F21V 29/503* | (2015.01) |
| *F21V 29/51* | (2015.01) |
| *F21V 29/74* | (2015.01) |
| *F21K 9/235* | (2016.01) |
| *F21K 9/27* | (2016.01) |
| *F21V 23/00* | (2015.01) |
| *F21V 23/04* | (2006.01) |
| *H04B 10/116* | (2013.01) |
| *F21Y 115/10* | (2016.01) |
| *F21Y 113/13* | (2016.01) |

(52) U.S. Cl.
CPC ........... *F21V 29/503* (2015.01); *F21K 9/235* (2016.08); *F21K 9/27* (2016.08); *F21V 23/003* (2013.01); *F21V 23/0435* (2013.01); *F21V 29/51* (2015.01); *F21V 29/74* (2015.01); *H04B 10/116* (2013.01); *F21Y 2113/13* (2016.08); *F21Y 2115/10* (2016.08)

(58) Field of Classification Search
CPC ..... H04B 10/116; F21V 29/503; F21V 29/51; F21V 29/74; F21V 23/003; F21V 23/0435; F21K 9/235; F21K 9/27; F21Y 2113/13; F21Y 2115/10

USPC .......................................................... 398/118
See application file for complete search history.

(56) References Cited

U.S. PATENT DOCUMENTS

| | | | | |
|---|---|---|---|---|
| 10,187,145 | B2* | 1/2019 | Tran ..................... | F21V 29/006 |
| 2003/0039010 | A1* | 2/2003 | Akimoto ............... | H04B 10/40 398/139 |
| 2007/0267976 | A1* | 11/2007 | Bohler ................... | B82Y 10/00 315/112 |
| 2014/0268769 | A1* | 9/2014 | Tran ..................... | F21V 29/006 362/249.02 |
| 2015/0109791 | A1* | 4/2015 | Johnston ............... | G02B 6/0096 362/294 |
| 2016/0047890 | A1* | 2/2016 | Ryan ..................... | G01S 5/16 398/118 |
| 2016/0254864 | A1* | 9/2016 | Mueller ................. | H04B 10/116 398/118 |
| 2017/0142810 | A1* | 5/2017 | Cho ....................... | H05B 37/0272 |
| 2017/0227207 | A1* | 8/2017 | Bendtsen ................ | F21V 29/74 |

* cited by examiner

*Primary Examiner* — Dalzid E Singh
(74) *Attorney, Agent, or Firm* — Tran & Associates (57) ABSTRACT

A communication system includes a light source to generate light; a broadband light transmitter control electronics to modulate a light signal and provide broadband optical data transmission network using the light source; a broadband light receiver control electronics to demodulate a received light signal from the broadband optical data transmission network; and a wired network transceiver coupled to the light transmitter/receiver to receive and transmit data between the optical data transmission network and a wired circuit.

17 Claims, 7 Drawing Sheets

LIFI COMMUNICATION SYSTEM

This application claims priority to application Ser. No. 15/090,521, which is a continuation of Ser. No. 13/845,056.

The present system relates generally to broadband lighting and communication system.

Traditionally, lighting has been generated using fluorescent and incandescent light bulbs. While both types of light bulbs have been reliably used, each suffers from certain drawbacks. For instance, incandescent bulbs tend to be inefficient, using only 2-3% of their power to produce light, while the remaining 97-98% of their power is lost as heat. Fluorescent bulbs, while more efficient than incandescent bulbs, do not produce the same warm light as that generated by incandescent bulbs. Additionally, there are health and environmental concerns regarding the mercury contained in fluorescent bulbs.

LED bulbs have been used in place of traditional bulbs. Compared to a traditional incandescent bulb, an LED bulb is capable of producing more light using the same amount of power. Additionally, the operational life of an LED bulb is orders of magnitude longer than that of an incandescent bulb, for example, 10,000-100,000 hours as opposed to 1,000-2,000 hours. However, one drawback is that an LED, being a semiconductor, generally cannot be allowed to get hotter than approximately 120° C. As an example, A-type LED bulbs have been limited to very low power (i.e., less than approximately 8 W), producing insufficient illumination for incandescent or fluorescent replacements.

Large metallic heat sink can be used but will cause the bulb to be shaped radically different from the traditionally shaped A-type form factor bulb. Additionally, the heat sink may make it difficult for the LED bulb to fit into pre-existing fixtures. Another solution is to fill the bulb with a thermally conductive liquid to transfer heat from the LED to the shell of the bulb. The heat may then be transferred from the shell out into the air surrounding the bulb. However, current liquid-filled LED bulbs do not efficiently transfer heat from the LED to the liquid. Additionally, current liquid-filled LED bulbs do not allow the thermally conductive liquid to flow efficiently to transfer heat from the LED to the shell of the bulb. For example, in a conventional LED bulb having LEDs placed at the base of the bulb structure, the liquid heated by the LEDs rises to the top of the bulb and falls as it cools. However, the liquid does not flow efficiently because the shear force between the liquid rising up and the liquid falling down slows the convective flow of the liquid. Another drawback of current liquid-filled LED bulbs is that they do not efficiently dissipate heat when the bulb is not positioned in an upright orientation. When a conventional LED bulb is placed upside-down, for example, the heat-generating LEDs are flipped from the bottom of the bulb to the top of the bulb. This prevents an efficient convective flow within the bulb because the heated liquid remains at the top of the bulb near the LEDs.

WIPO Patent Application WO/2012/106454 discloses an LED bulb with a base, a shell connected to the base, and a thermally conductive liquid held within the shell. The LED bulb has a plurality of LEDs mounted on LED mounting surfaces disposed within the shell. The LED mounting surfaces face different radial directions, and the LED mounting surfaces are configured to facilitate a passive convective flow of the thermally conductive liquid within the LED bulb to transfer heat from the LEDs to the shell when the LED bulb is oriented in at least three different orientations. In a first orientation, the shell is disposed vertically above the base. In a second orientation, the shell is disposed on the same horizontal plane as the base. In a third orientation, the shell is disposed vertically below the base.

SUMMARY

A communication system includes a light source to generate light; a broadband light transmitter control electronics to modulate a light signal and provide broadband optical data transmission network using the light source; a broadband light receiver control electronics to demodulate a received light signal from the broadband optical data transmission network; and a wired network transceiver coupled to the light transmitter/receiver to receive and transmit data between the optical data transmission network and a wired circuit.

In another aspect, systems and methods are disclosed for making a light segment by forming a sealed body having an interior chamber; creating a boiling enhancement surface positioned in a predetermined location on the interior chamber; filling the interior chamber with a liquid portion and thermally coupled to the liquid portion at all orientations of the light blade; and boiling the liquid portion with a light source located on the predetermined location on an exterior portion of the sealed body.

Advantages of the bulb may include one or more of the following. The system uses evaporation as a cooling mechanism. The system additionally uses liquid cooling as a second cooling mechanism. For low wattage unit, each blade has its own cooling system, resulting in a compact and reliable system that facilitates individual replacement of blades for maintenance. For high wattage bulbs, a combination of evaporative cooling as well as liquid cooling is used to maximize heat transfer. Larger and or more power light bulbs such as 150 W equivalent bulbs and 200 W equivalent bulbs can be designed as heat is efficiently removed. The bulb size can be reduced for a given wattage to be drop in replacement in size for conventional bulbs. The bulb can efficiently transferring heat away from the LEDs, while the bulb is in various orientations, is desired. This is done at a far more cost effective manner than conventional designs. The bulb can communicate and/or transfer data over a wired or wireless network, and the data can be user data or can provide operational details of each bulb, down to each LED, to monitoring software for optimizing efficiency and maintenance.

DESCRIPTION

Various embodiments are described below, relating to LED bulbs. As used herein, an "LED bulb" refers to any light-generating device (e.g., a lamp) in which at least one LED is used to generate the light. Thus, as used herein, an "LED bulb" does not include a light-generating device in which a filament is used to generate the light, such as a conventional incandescent light bulb. It should be recognized that the LED bulb may have various shapes in addition to the bulblike A-type shape of a conventional incandescent light bulb. For example, the bulb may have a tubular shape, globe shape, or the like. The LED bulb of the present disclosure may further include any type of connector; for example, a screw-in base, a dual-prong connector, a standard two- or three-prong wall outlet plug, bayonet base, Edison Screw base, single pin base, multiple pin base, recessed base, flanged base, grooved base, side base, or the like.

As used herein, the term "liquid" refers to a substance capable of flowing such as water. Also, the substance used as the thermally conductive liquid is a liquid or at the liquid state within, at least, the operating ambient temperature ranges of the bulb. An exemplary temperature range includes temperatures between −40° C. to +40° C. Also, as used herein, "passive convective flow" refers to the circulation of a liquid without the aid of a fan or other mechanical devices driving the flow of the thermally conductive liquid.

Figure 1A:
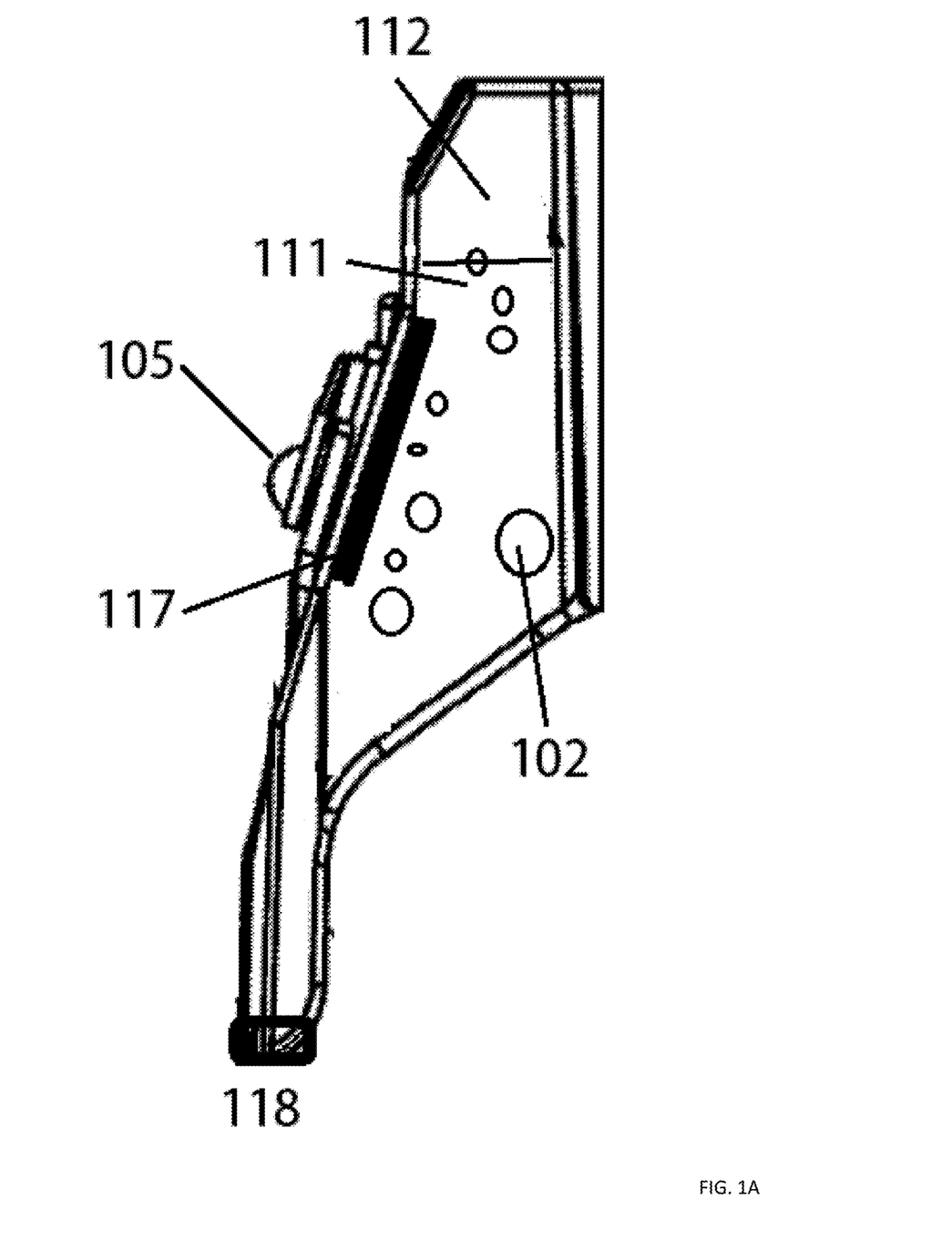
FIGS. 1A-1C illustrate an exemplary bulb blade in various orientations.
Figure 1B:
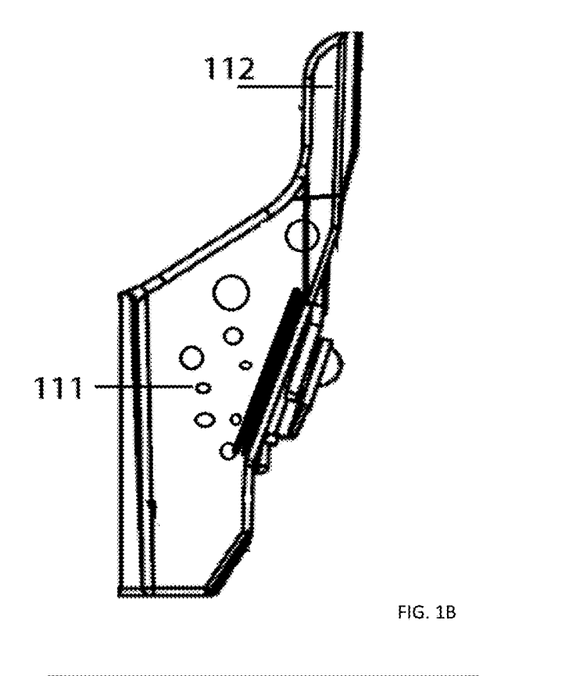
Figure 1C:
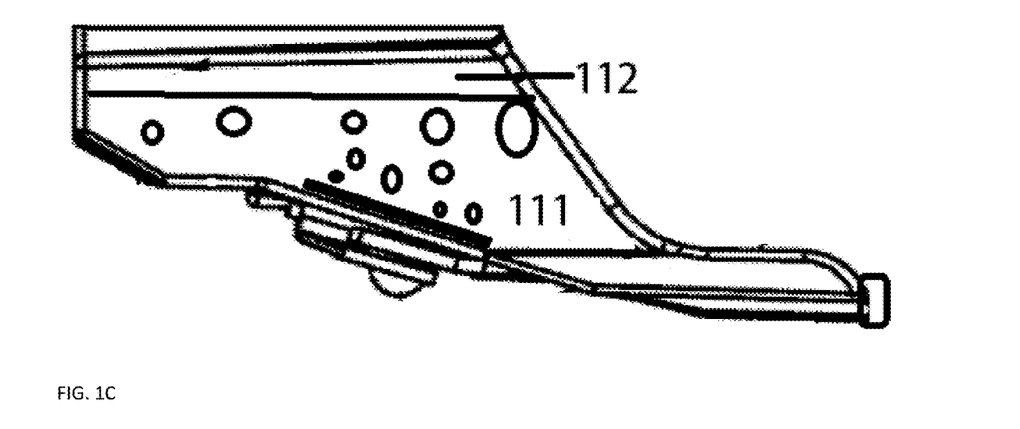

FIGS. 1A, 1B and 1C show an exemplary light blade with water cooling in three exemplary orientations. As shown in FIG. 1A, the light blade has a light source 105 such as an LED. The light source 105 is thermally secured to a hollow sealed body that includes a liquid portion 111 but not completely filled up, so that a vapor or gas portion 112 remains in the body. The volume of the liquid portion needs to be enough so that it covers a portion of a boiling enhancement surface 117, regardless of orientation. The light source 105 generates heat during use, and the boiling enhancement surface 117 is positioned on the opposite side of the light source 105. The boiling enhancement 117 causes the liquid portion 111 to boil rapidly and the phase change from liquid to gas removes heat from the light source 105. To facilitate replacement of a failed LED, the light blade has a connector 118 which can be inserted into a corresponding connector on a base that provides power as well as additional heat sinks to remove heat from the bulb. In one embodiment, the base contains light transceiver control electronics that enable secure wireless data transmission network for the users as well. Such optical wireless transmission network control is disclosed in copending application Ser. No. 13/300,598 and entitled "SOLID STATE LIGHT SYSTEM WITH OPTICAL COMMUNICATION CAPABILITY" filed 20 Nov. 2011, the content of which is incorporated by reference.

In one embodiment, the boiling enhancement surface can be done by scratching or creating indentations on the wall of the body. In another embodiment, the boiling enhancement surface 117 uses a coating technique that combines the advantages of a mixture batch type and thermally-conductive microporous structures. The microporous surface is created using particles of various sizes comprising any metal which can be bonded by the soldering process including nickel, copper, aluminum, silver, iron, brass, and various alloys in conjunction with a thermally conductive binder. A coating is applied on the surface of a substrate while mixed with a solvent. The solvent is vaporized after the application prior to heating the surface sufficiently to melt the binder to bind the particles.

The boiling enhancement coating can be optimized in terms of cavity-generating particle size to ensure no degradation in nucleate heat transfer rate and critical heat flux specification for a wide selection of liquid coolant types. This naturally translates to lower cost boiling cooler if the cheap liquid, such as water, instead of specially developed refrigerant or chemical fluid, can be used. A surface containing nickel particles of sizes around 30-50 um using −100+325 mesh nickel powder mixed with solder pastes can provide superior boiling heat transfer performance for water as the liquid coolant.

The boiling enhancement can be a microporous coat or a boiling surface enhancement. In one implementation, a coating technique combines the advantages of a mixture batch type and thermally-conductive microporous structures. The microporous surface is created using particles of various sizes comprising any metal which can be bonded by the soldering process including nickel, copper, aluminum, silver, iron, brass, and various alloys in conjunction with a thermally conductive binder. The coating is applied on the surface of a substrate while mixed with a solvent. The solvent is vaporized after the application prior to heating the surface sufficiently to melt the binder to bind the particles. The mixture batch type application is an inexpensive and easy process, not requiring extremely high operating temperatures. The coating surface created by this process is insensitive to its thickness due to high thermal conductivity of the binder. Therefore, large size cavities can be constructed in the microporous structures for some poorly wetting but potentially low cost fluids, such as water, without causing serious degradation of boiling enhancement. This makes the boiling cooler keep its high cooling efficiency for various types of liquid coolants simply by adjusting the size of metal particles to allow the size range of porous cavities formed fit well with the surface tension of the selected liquid to optimize boiling heat transfer performance.

During operation, the liquid inside the light blade evaporates to dissipate heat from LED. Subsequently, the coolant 150 condenses, and the cycle is repeated to cool the LED. The first phase of the liquid 111 inside the chamber of the light blade can be a liquid phase and the second phase can be a vapor phase. The liquid 111 can be water or any suitable coolant. Additionally, boiling heat transfer can be done with direct component immersion in a dielectric liquid as a means of providing heat transfer coefficients large enough to meet forecasted dissipation levels, while maintaining reduced component temperatures. Dielectric liquids (3M Fluorinert family) can be used because they are chemically inert and electrically non-conducting. Their use with boiling heat transfer introduces significant design challenges which include reducing the wall superheat at boiling incipience, enhancing nucleate boiling heat transfer rates, and increasing the maximum nucleate boiling heat flux (CHF). Water can also be used for low cost.

The boiling enhancement coating provides a surface enhancement which creates increased boiling nucleation sites, decreases the incipient superheats, increases the nucleate boiling heat transfer coefficient and increases the critical heat flux. This surface enhancement is particularly advantageous when applied to microelectronic components such as LED, LED driver and other silicon chips that cannot tolerate the high temperature environment required to bond existing heat sinks onto the chip, or mechanical treatments such as sandblasting, and is also particularly advantageous when applied to phase change heat exchanger systems that require chemically stable, strongly bonded surface microstructures. The boiling enhancement coating can be a composition of matter such as a glue, a solvent and cavity-generating particles. This composition is applied to a surface and then cured by low heat or other means, including but not limited to air drying for example, which evaporates the solvent and causes the glue with embedded particles to be bonded to the surface. The embedded particles provide an increased number of boiling nucleation sites. As used herein, "paint" means a solution or suspension which is in liquid or semiliquid form and which may be applied to a surface and when applied, can be cured to adhere to the surface and to form a thin layer or coat on that surface. The paint may be applied by any means such as spread with a brush, dripped from a brush or any other instrument or sprayed, for example. Alternatively, the surface may be dipped into the paint. By curing, is meant that the solvent will be evaporated, by exposure to the rays of a lamp, for example and the remaining composition which includes the suspended particles will adhere to the surface. As used herein, "glue" means any compound which will dissolve in an easily evaporated solvent and will bond to the particles and to the target surface. Some types of glue will be more compatible with certain applications and all such types of such glue will fall within the scope of the present claimed invention. The glue to be used in the practice of the claimed invention would be any glue which exhibits the above mentioned characteristics and which is preferably a synthetic or naturally occurring polymer. Examples of types of glue that could be used in the present invention include ultraviolet activated glue or an epoxy glue, for example. Epoxy glues are well known glues which comprise reactive epoxide compounds which polymerize upon activation. Ultraviolet glues are substances which polymerize upon exposure to ultraviolet rays. Preferably such glues would include 3M 1838-L A/13 and most preferably the thermally conductive epoxies Omegabond 101 or Omegatherm 201 (Omega Engineering, Stamford, Conn.) and the like or any glue which would adhere to the surface and to the particles. Another preferred glue is a brushable ceramic glue. Brushable ceramic glue is a low viscosity, brushable epoxy compound. Preferred brushable ceramic glues have a viscosity of about 28,000 cps and a maximum operating temperature of about 350.degree. F., and most preferred is Devcon Brushable Ceramic Glue. Thermally conductive epoxies are those with thermal conductivities in the range of about 7 to about 15 BTU/(ft.sup.2) (sec) (.degree.F./in). The particles of the present invention may be any particles which would generate cavities on the surface in the manner disclosed herein. As used herein, "cavity-generating particles" means particles which when applied to a surface, or when fixed in a thin film on a surface, form depressions in the surface of from about 0.5 .um to about 10 um in width, which depressions are suitable for promoting boiling nucleation. Preferred particles disclosed herein include crystals, flakes and randomly shaped particles, but could also include spheres or any other shaped particle which would provide the equivalent cavities. The particles are also not limited by composition. Such particles could comprise a compound such as an organic or inorganic compound, a metal, an alloy, a ceramic or combinations of any of these. One consideration is that for certain applications, the particles should be electrically non-conducting. Some preferred particles might comprise silver, iron, copper, diamond, aluminum, ceramic, or an alloy such as brass and particularly preferred particles are silver flakes or, for microelectronic applications, diamond particles, copper particles or aluminum.

In one embodiment, a boiling enhancement composition can include solvent, glue and cavity-generating particles in a ratio of about 10 ml solvent to about 0.1 ml of glue to from about 0.2 grams to about 1.5 grams of cavity-generating particles. Alternatively, the preferred composition is in a ratio of about 10 ml solvent to 0.1 ml of glue to about 1.5 grams of cavity-generating particles. It is understood that compositions of different ratios will be applicable to different utilities and that the ratios disclosed herein are not limiting in any way to the scope of the claimed invention. For example, an embodiment of the present invention is a composition of matter comprising solvent, glue and cavity-generating particles wherein the composition is 85-98% (v/v) solvent, 0.5-2% (v/v) glue and 1.5-15% (w/v) cavity-generating particles. By % (v/v) is meant liquid volume of component divided by total volume of suspension. By % (w/v) is meant grams of component divided by 100 ml of suspension.

The boiling enhancement composition may be added to the surface in any manner appropriate to the particular application. For example, the composition may be painted or dripped onto the surface, or even sprayed onto the surface. Alternatively, the surface or object may be dipped into the composition of the present invention. Following any of these applications, the enhancing composition would then be cured. It is contemplated that the composition of the present invention may also be incorporated into the surface as it is being manufactured and the boiling heat transfer enhancement would be an integral part of the surface. More details on the boiling enhancement coating is described in U.S. Pat. No. 5,814,392, the content of which is incorporated by reference.

Non-Dielectric liquid coolant such as water is preferred due to low cost and low environmental issues. Dielectric liquid coolants can also be used. Aromatics coolant such as synthetic hydrocarbons of aromatic chemistry (i.e., diethyl benzene [DEB], dibenzyl toluene, diaryl alkyl, partially hydrogenated terphenyl) can be used. Silicate-ester such as Coolanol 25R can be used. Aliphatic hydrocarbons of paraffinic and iso-paraffinic type (including mineral oils) can be used as well. Another class of coolant chemistry is dimethyl- and methyl phenyl-poly (siloxane) or commonly known as silicone oil—since this is a synthetic polymeric compound, the molecular weight as well as the thermo-physical properties (freezing point and viscosity) can be adjusted by varying the chain length. Silicone fluids are used at temperatures as low as −100° C. and as high as 400° C. These fluids have excellent service life in closed systems in the absence of oxygen. Also, with essentially no odor, the non-toxic silicone fluids are known to be workplace friendly. However, low surface tension gives these fluids the tendency to leak around pipe-fittings, although the low surface tension improves the wetting property. Fluorinated compounds such as perfluorocarbons (i.e., FC-72, FC-77) hydrofluoroethers (HFE) and perfluorocarbon ethers (PFE) have certain unique properties and can be used in contact with the electronics.

Non-dielectric liquid coolants offer attractive thermal properties, as compared with the dielectric coolants. Non-dielectric coolants are normally water-based solutions. Therefore, they possess a very high specific heat and thermal conductivity. De-ionized water is a good example of a widely used electronics coolant. Other popular non-dielectric coolant chemistries include Ethylene Glycol (EG), Propylene Glycol (PG), Methanol/Water, Ethanol/Water, Calcium Chloride Solution, and Potassium Formate/Acetate Solution, among others.

In another embodiment the body-shell can be made of plastic and further can be molded into a relatively complex structure with asymmetric shape or small detailed features, which is usually much more expensive, if not impossible, to be manufactured using metal. The boiling cooler also comprises a boiling enhancement surface on a thermally conductive side shell, and partially filled liquid coolant. Vapor generated from boiling helps spread heat over all extended space adding extra pathway for cooling through convection. In some cases, the electric circuit module boards and/or power supply, on which many electric or photonic components/devices are tightly packed, have very stringent requirements in the mechanical design for the associated or integrated coolers. Using plastic material for the body-shell of the bulb can easily make the bulb cooler in complex shape or specific dimension without worry about associated costs. In other system applications such as those of FIG. 3, forced air cooling may be not available, making the traditional heat sink impossible to handle the ever-increasing heat flux out of those electronics system. The cooler utilizing boiling enhancement surface achieves efficient cooling within the vessel, making the forced air convection not critical for the system. In addition, natural or forced-air convection can still provide extra heat exchange through the extended exterior surface of the vessel of this boiling cooler.

The body-shell for the light segment or light blade can be made of less-expensive materials comprising plastic, vinyl, paper, or molded and baked copper powder, which is sealed with side to form an enclosed vessel holding partially filled liquid coolant. The shape of the body-shell is intentionally made to have an extended surface area for extra benefit of convection cooling. Although the shape of the body-shell is relatively irregular it can be done easily and inexpensively because of the material selection such as plastic.

The column can have one or more extrusions or posts each having the boiling enhancement surface in combination with the liquid coolant and at least a portion of the boiling enhancement surface contacts the liquid and evaporation occurs regardless of the orientation of the vessel. The extended heat conducting structure can also be a pyramid. The extended heat structure can be a sloped surface, wherein the sloped surface is higher toward a center of the structure and lower toward an edge of the structure. The surfaces may have other features such as grooves or bumps to facilitate escaping of bubbles forming on the surfaces and to increase the contact area between the surface and the liquid. The liquid forms bubbles formed on the surface of the coating and wherein the bubble escapes toward the top. The body-shell of the vessel can have one or more extended plate and one or more extruded fins. The body-shell of the vessel can at least partially comprises one or more of: metal, plastic, vinyl, paper, molded and baked copper powder, electrically insulating and/or thermally conductive plastic. The boiling enhancement surface coupled to the thermally conductive side on a surface within the vessel is at least partially submerged in the liquid coolant. The boiling enhancement surface comprises a microporous surface structure insensitive to coating thickness, formed by combining a mixed cavity-generating particle batch and a thermal conductive binder. The binder can be solder, silver, gold, metal binder, non-metal binder, or epoxy. The liquid coolant comprises water. The liquid coolant comprises one of: a dielectric liquid, a non-dielectric liquid.

Figure 2A:
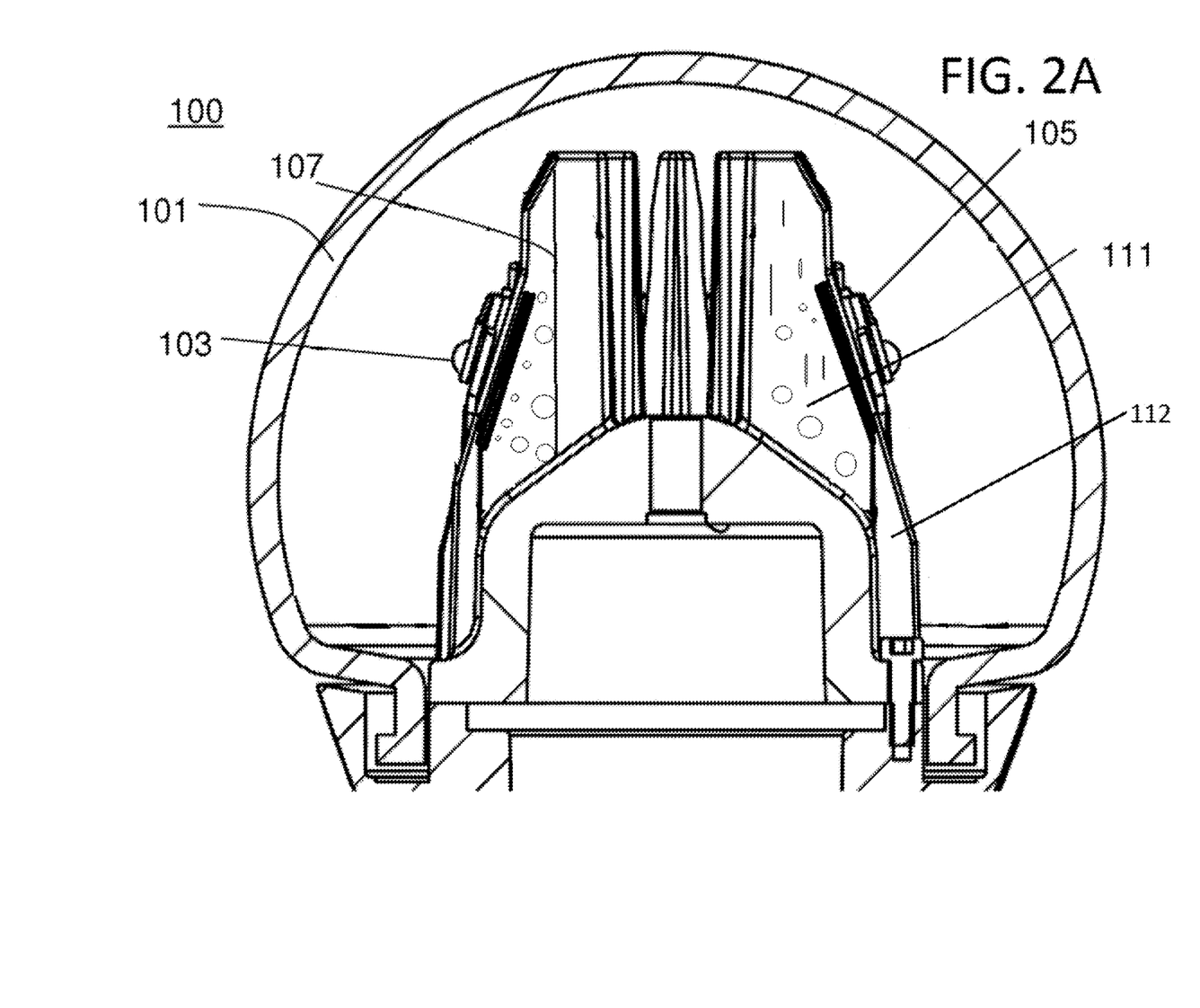
FIGS. 2A-2B illustrates an exemplary solid state bulb in various orientations.
Figure 2B:
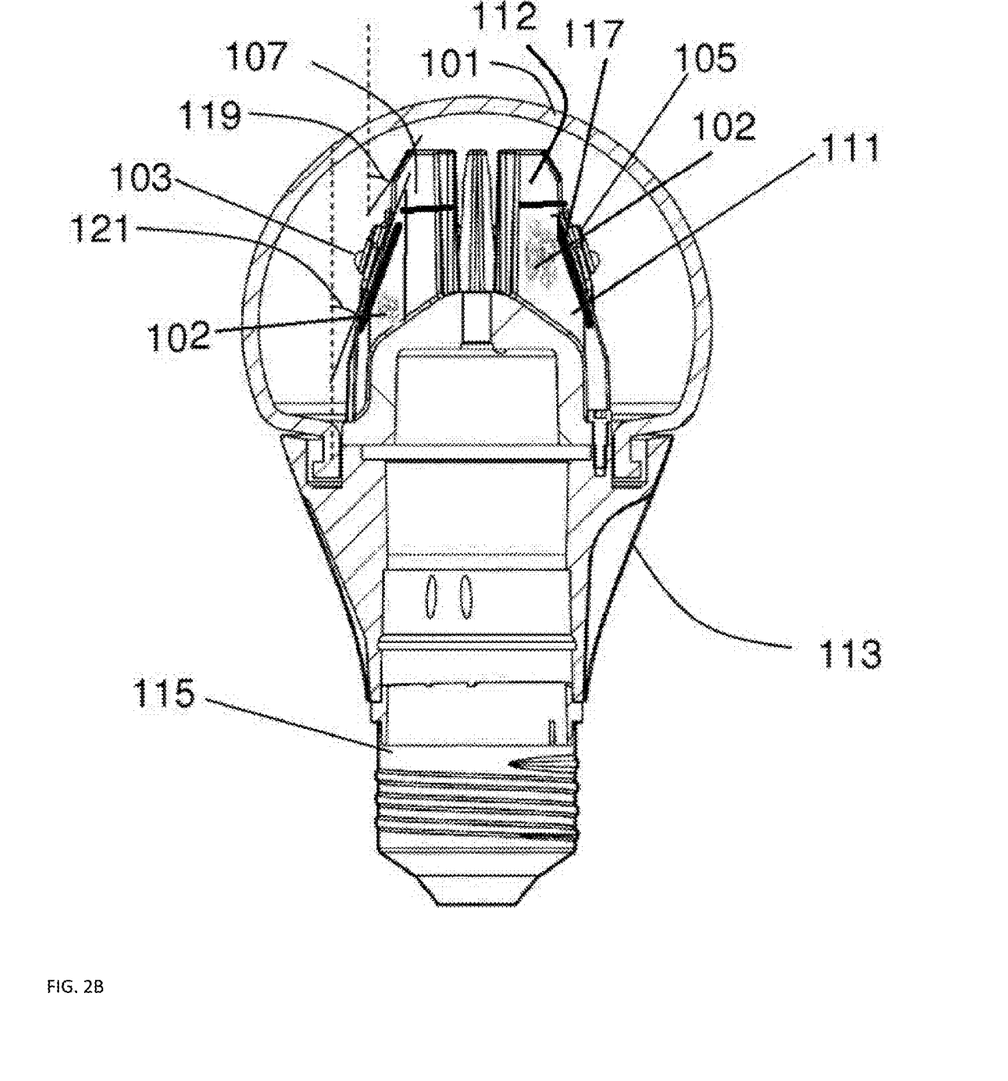

FIGS. 2A and 2B illustrate a perspective view and a cross-sectional view, respectively, of exemplary LED bulb 100. LED bulb 100 includes a base 112 and a shell 101 encasing the various components of LED bulb 100. For convenience, all examples provided in the present disclosure describe and show LED bulb 100 being a standard A-type form factor bulb. However, as mentioned above, it should be appreciated that the present disclosure may be applied to LED bulbs having any shape, such as a tubular bulb, globe-shaped bulb, or the like.

Shell 101 may be made from any transparent or translucent material such as plastic, glass, polycarbonate, or the like. Shell 101 may include dispersion material spread throughout the shell to disperse light generated by LEDs 103. The dispersion material prevents LED bulb 100 from appearing to have one or more point sources of light. LED bulb 100 includes a plurality of LEDs 103 connected to LED mounts 107, which are disposed within shell 101. LED mounts 107 may be made of any thermally conductive material, such as aluminum, copper, brass, magnesium, zinc, or the like. Since LED mounts 107 are formed of a thermally conductive material, heat generated by LEDs 103 may be conductively transferred to LED mounts 107. Thus, LED mounts 107 may act as heat-sinks for LEDs 103.

In the present exemplary embodiment, thermal bed 105 is inserted between an LED 103 and an LED mount 107 to improve heat transfer between the two components. Thermal bed 105 may be made of any thermally conductive material, such as aluminum, copper, thermal paste, thermal adhesive, or the like. Thermal bed 105 may have a higher thermal conductivity than LED mount 107. For example, LED mount 107 may be formed of aluminum and thermal bed 105 may be formed of copper. It should be recognized, however, that thermal bed 105 may be omitted, and LED mount 107 can be directly connected to LEDs 103.

In one exemplary embodiment, LED mounts 107 are finger-shaped projections with a channel 109 formed between pairs of LED mounts 107. One advantage of such a configuration is increased heat dissipation due to the large surface-area-to-volume ratio of LED mounts 107. It should be recognized that LED mounts 107 may have various shapes other than that depicted in FIG. 1A in order to be finger-shaped projections. For example, LED mounts 107 may be straight posts with a channel formed between pairs of posts.

The top portions of LED mounts 107 may be angled or tapered at an angle 119, which is measured relative to a vertical line when LED bulb 100 is in a vertical position. Exemplary angle 119 includes a range of −35° to 90°. Also, all the top portions of LED mounts 107 can be angled or tapered at the same angle, such as 9° or 15°. Alternatively, a combination of angles can be used, such as half at 18° and half at 30°, or half at 9° and half at 31°. As will be described in greater detail below with respect to FIGS. 2A-2C, the angled top portions of LED mounts 107 may facilitate the passive convective flow of liquids within LED bulb 100.

LEDs 103 are connected to portions of LED mounts 107, which serve as mounting surfaces for LEDs 103, that are angled or tapered at an angle 121, which is measured relative to a vertical line when LED bulb 100 is in a vertical position. Exemplary angle 121 includes a range of −35° to 90°. Also, the portions of LED mounts 107 to which LEDs 103 are connected can be angled or tapered at the same angle, such as 9° or 15°. Alternatively, a combination of angles can be used, such as half at 18° and half at 30°, or half at 9° and half at 31°. The particular angle or angles may be selected to create a desirable photometric distribution.

In one embodiment, as depicted in FIG. 2B, the angled or tapered portions on which LEDs 103 are connected (the mounting surfaces) are separate from the top portions of LED mounts 107, which are also angled or tapered. It should be recognized, however, that LEDs 103 can be connected on the top portions of LED mounts 107, which are angled or tapered.

Figure 3:
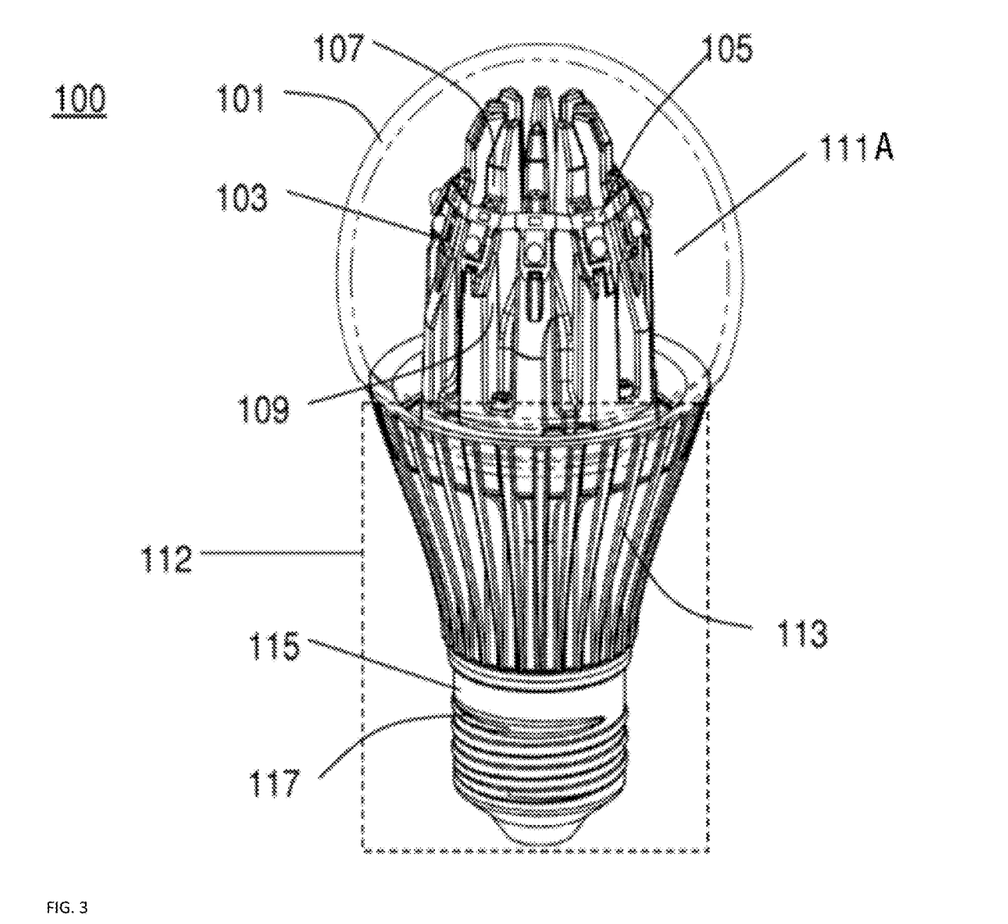
FIG. 3 shows an exemplary evaporative cooled light blade operating in a liquid cooled bulb.

Turning now to FIG. 3, a combination LED bulb is shown. In this embodiment, in addition to each light blade being cooled by evaporative heat transfer, the bulb is also cooled by an electrically non-conductive or inert material, but thermally conductive fluid such as mineral oil. This embodiment of a light emitting diode (LED) bulb has a base to receive one or more light blades, each light blade including:

a sealed body having an interior chamber with a liquid portion and a vapor or gas portion; a boiling enhancement surface positioned in a predetermined location on the interior chamber and thermally coupled to the liquid portion at all orientations of the light blade; an LED thermally coupled to the predetermined location on an exterior portion of the sealed body; and an LED mounting surface, wherein the LED is mounted to the LED mounting surface, wherein the LED mounting surface faces different radial directions, and wherein the LED mounting surface provides a passive convective flow of the thermally conductive liquid within the LED bulb. A shell is connected to the base; and a thermally conductive liquid held within the shell. Inside the chamber of each light segment or light blade, the liquid can be conductive or non-conductive, however, outside the chamber, the LEDs are immersed in a thermally conductive but electrically inert liquid. Thus, two levels of cooling are provided: an evaporative cooling system occurs inside the chamber of each light blade or segment and a liquid cooled system outside the chamber.

The LED bulb 100 is filled with thermally conductive liquid 111A for transferring heat generated by LEDs 103 to shell 101. Thermally conductive liquid 111A may be any thermally conductive liquid, mineral oil, silicone oil, glycols (PAGs), fluorocarbons, or other material capable of flowing. It may be desirable to have the liquid chosen be a non-corrosive dielectric. Selecting such a liquid can reduce the likelihood that the liquid will cause electrical shorts and reduce damage done to the components of LED bulb 100.

In the present embodiment, base 112 of LED bulb 100 includes a heat-spreader base 113. Heat-spreader base 113 may be made of any thermally conductive material, such as aluminum, copper, brass, magnesium, zinc, or the like. Heat-spreader base 113 may be thermally coupled to one or more of shell 101, LED mounts 107, and thermally conductive liquid 111A. This allows some of the heat generated by LEDs 103 to be conducted to and dissipated by heat-spreader base 113.

The size and shape of LED mounts 107 may affect the amount of heat conducted to conductive liquid 111 and heat-spreader base 113. For example, when LED mounts 107 are formed to have a large surface-area-to-volume ratio, a large percentage of the total heat in LED mounts 107 may be conducted from LED mounts 107 to conductive liquid 111, while a small percentage of the total heat in LED mounts 107 may be conducted from LED mounts 107 to heat-spreader base 113. Where LED mounts 107 have a smaller surface-area-to-volume ratio, a small percentage of the total heat in LED mounts 107 may be conducted from LED mounts 107 to conductive liquid 111, while a large percentage of the total heat in LED mounts 107 may be conducted from LED mounts 107 to heat-spreader base 113.

In this embodiment, base 112 of LED bulb 100 includes a connector base 115 for connecting the bulb to a lighting fixture. Connector base 115 may be a conventional light bulb base having threads 117 for insertion into a conventional light socket. However, it should be appreciated that connector base 115 may be any type of connector, such as a screw-in base, a dual-prong connector, a standard two- or three-prong wall outlet plug, bayonet base, Edison Screw base, single pin base, multiple pin base, recessed base, flanged base, grooved base, side base, or the like.

During operation of one example where the LED bulb 100 points upward, the LED becomes hot and the liquid inside the chamber boil and cools down the light blade individually. Outside of the light blade, the liquid at the center of LED bulb 100 also rises towards the top of shell 101. This is due to the heat generated by LEDs 103 and conductively transferred to thermally conductive liquid 111 via LEDs 103 and LED mounts 107. As thermally conductive liquid 111A is heated, its density decreases relative to the surrounding liquid, thereby causing the heated liquid to rise to the top of shell 101.

As described above with respect to FIG. 1A, LED mounts 107 may be separated by channels 109. Separating LED mounts 107 with channels 109 not only increases the surface-area-to-volume ratio of LED mounts 107, but also facilitates an efficient passive convective flow of thermally conductive liquid 111A by allowing the flow of thermally conductive liquid 111A there between. For example, since the liquid along the surfaces of LED mounts 107 is heated faster than the surrounding liquid, an upward flow of thermally conductive liquid 111 is generated around LED mounts 107 and within channels 109. In one example, channels 109 may be shaped to form vertical channels pointing towards the top of shell 101. As a result, thermally conductive liquid 111 may be guided along the edges of channel 109 towards the top and center of shell 101.

Once the heated, thermally conductive liquid 111A reaches the top portion of shell 101, heat is conductively transferred to shell 101, causing thermally conductive liquid 111 to cool. As thermally conductive liquid 111A cools, its density increases, thereby causing thermally conductive liquid 111A to fall. In one example, as discussed above, the top portions of LED mounts 107 may be angled. The sloped surfaces of LED mounts 107 may direct the flow of the cooled, thermally conductive liquid 111A outwards and down the side surface of shell 101. By doing so, thermally conductive liquid 111A remains in contact with shell 101 for a greater period of time, allowing more heat to be conductively transferred to shell 101. In addition, since the downward flow of thermally conductive liquid 111A is concentrated along the surface of shell 101, the shear force between the upward flowing liquid at the center of LED bulb 100 and the downward flowing liquid along the surface of shell 101 is reduced, thereby increasing the convective flow of thermally conductive liquid 111A within LED bulb 100.

Once reaching the bottom of shell 101, thermally conductive liquid 111A flows inwards toward LED mounts 107 and rises as heat generated by LEDs 103 heats up the liquid. The heated, thermally conductive liquid 111 is again guided through channels 109 as described above. The described convective cycle continuously repeats during operation of LED bulb 100 to cool LEDs 103. It should be appreciated that the convective flow described above represents the general flow of liquid within shell 101. One of ordinary skill in the art will recognize that some of thermally conductive liquid 111A may not reach the top and bottom of shell 101 before being cooled or heated sufficiently to cause the liquid to fall or rise.

Shell 101 and LED mounts 107 may be formed into a circle any other desired shape. The LED mounting surfaces face different radial directions. As a result of LED mounts 107 conforming to the shape of shell 101, the outer side surfaces of LED mounts 107 may guide the flow of the cooled, thermally conductive liquid 111 down the side surfaces of shell 101. By doing so, thermally conductive liquid 111A remains in contact with shell 101 for a greater period of time, allowing more heat to be conductively transferred to shell 101. Since the downward flow of thermally conductive liquid 111A is concentrated on the outer surface of shell 101, the shear force between the upward flowing liquid at the center of LED bulb 100 and the downward flowing liquid along the surface of shell 101 is reduced, thereby increasing the convective flow of thermally conductive liquid 111A within LED bulb 100.

Once reaching the bottom of shell 101, thermally conductive liquid 111A flows towards LED mounts 107 and rises as heat generated by LEDs 103 heats up the liquid. The heated thermally conductive liquid 111A is again guided through channels 109 as described above. The described convective cycle continuously repeats during operation of LED bulb 100 to cool LEDs 103. It should be appreciated that the convective flow described above represents the general flow of liquid within shell 101. One of ordinary skill in the art will recognize that some of thermally conductive liquid 111A may not reach the top and bottom of shell 101 before being cooled or heated sufficiently to cause the liquid to fall or rise.

LED mounts 107 may be separated by channels 109. Separating LED mounts 107 with channels 109 not only increases the surface-area-to-volume ratio of LED mounts 107, but may also facilitate an efficient passive convective flow of thermally conductive liquid 111A by directing the flow of thermally conductive liquid 111A. For example, since the liquid along the surfaces of LED mounts 107 is heated faster than the surrounding liquid, an upward flow of thermally conductive liquid 111A is generated around LED mounts 107 and within channels 109. In one example, channels 109 may be shaped to form vertical channels pointing towards the bottom (previously top) of shell 101. As a result, thermally conductive liquid 111A may be guided along the vertical edges of channel 109 towards the top (previously bottom) of shell 101.

In another example configuration, once the heated, thermally conductive liquid 111A reaches the top (previously bottom) portion of shell 101, heat is conductively transferred to shell 101, causing thermally conductive liquid 111A to cool. As thermally conductive liquid 111A cools, its density increases, thereby causing thermally conductive liquid 111A to fall. Since the heated, thermally conductive liquid 111A is forced up and outwards in an upside-down vertical orientation, the cooled, thermally conductive liquid 111A falls down the sides of shell 101. This allows thermally conductive liquid 111A to remain in contact with shell 101 for a greater period of time, allowing more heat to be conductively transferred to shell 101. In addition, since the downward flow of thermally conductive liquid 111A is concentrated along the surface of shell 101, the shear force between the upward flowing liquid at the center of LED bulb 100 and the downward flowing liquid along the surface of shell 101 is reduced, thereby increasing the convective flow of thermally conductive liquid 111A within LED bulb 100.

Once reaching the bottom (previously top) of shell 101, thermally conductive liquid 111A may move towards the center of LED bulb 100 and rise as heat generated by LEDs 103 heats up the liquid. In one example, as illustrated by FIGS. 1A-1B and FIGS. 2A-2C, the bottom (previously top) portions of LED mounts 107 may be angled inwards towards the center of LED bulb 100. The sloped surface of LED mount 107 may direct the flow of the heated, thermally conductive liquid 111A outwards and upwards to the top (previously bottom) portion of shell 101, as illustrated by FIG. 2C. The heated, thermally conductive liquid 111A may be further guided through channels 109 towards the top (previously bottom) portion of shell 101. The described convective cycle continuously repeats during operation of LED bulb 100 to cool LEDs 103. It should be appreciated that the convective flow described above represents the general flow of liquid within shell 101. One of ordinary skill in the art will recognize that some of thermally conductive liquid 111A may not reach the top and bottom of shell 101 before being cooled or heated sufficiently to cause the liquid to fall or rise.

A passive convective flow of thermally conductive liquid 111A throughout shell 101 is improved by the inclusion of the central structure comprising LED mounts 107. Providing LEDs 103 on LED mounts 107 near the center of shell 101 avoids the situation described above with respect to a conventional LED bulb where the heat-generating elements (LEDs) are positioned at the top of the bulb.

Figure 4:
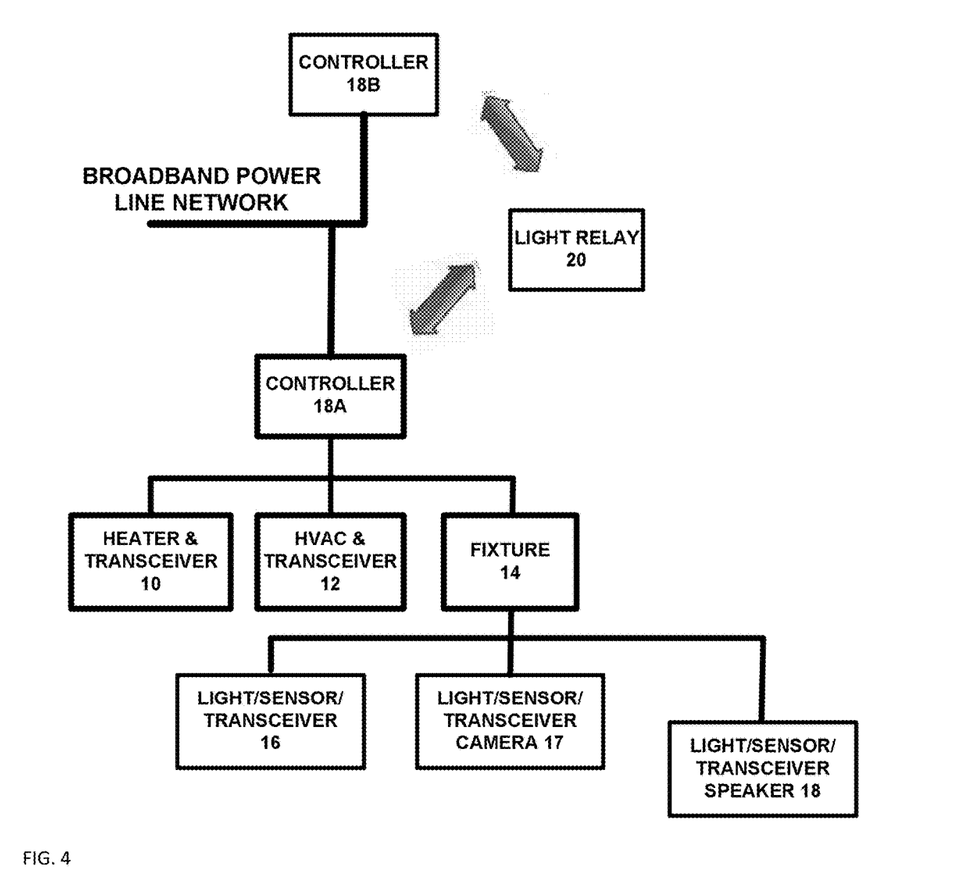
FIG. 4 shows an exemplary smart building with networking connectivity for the bulb(s).

As shown in FIG. 4, a smart building system for use in a building can include a heater & transceiver 10, an HVAC system with transceiver 12, a light fixture 14, an LED-based light 16, a controller 18A. The controller 18A communicates with one or more light relays or repeaters 20. The HVAC system 12 can include known HVAC components, such as a heater, an air conditioner, fans, a thermostat, and ductwork. The HVAC system 12 can regulate the temperature, humidity, and/or other air quality considerations in one or more rooms of the building. For example, the HVAC system 12 can maintain the temperature in one or more rooms of the building at a level near a setpoint temperature input to the thermostat. The HVAC system 12 can also be capable of controlling airflow between the building and the environment surrounding the building, such as by opening or closing vents, windows, skylights, and other barriers between the building and the surrounding environment. In addition or alternative to the HVAC system 12, the smart building system 10 can include another type of temperature control system (e.g., a control for heated floors), another type of light control system (e.g., a control for window shades or dynamically tinted windows), or some other control for the building. The HVAC system 12 can be in communication with the controller 18 as is described below in greater detail.

The light fixture 14 can be designed to accept standard fluorescent tubes, such as a T-5, T-8, or T-12 fluorescent tube, or other standard sized light, such as incandescent bulbs. Alternatively, the fixture 14 can be designed to accept non-standard sized lights, such as lights installed by an electrician. Additionally, the fixture 14 can include one or more fixtures. The fixture 14 can be in communication with the controller 18 for controlling the operation of the light 16 as is described below.

Figure 5:
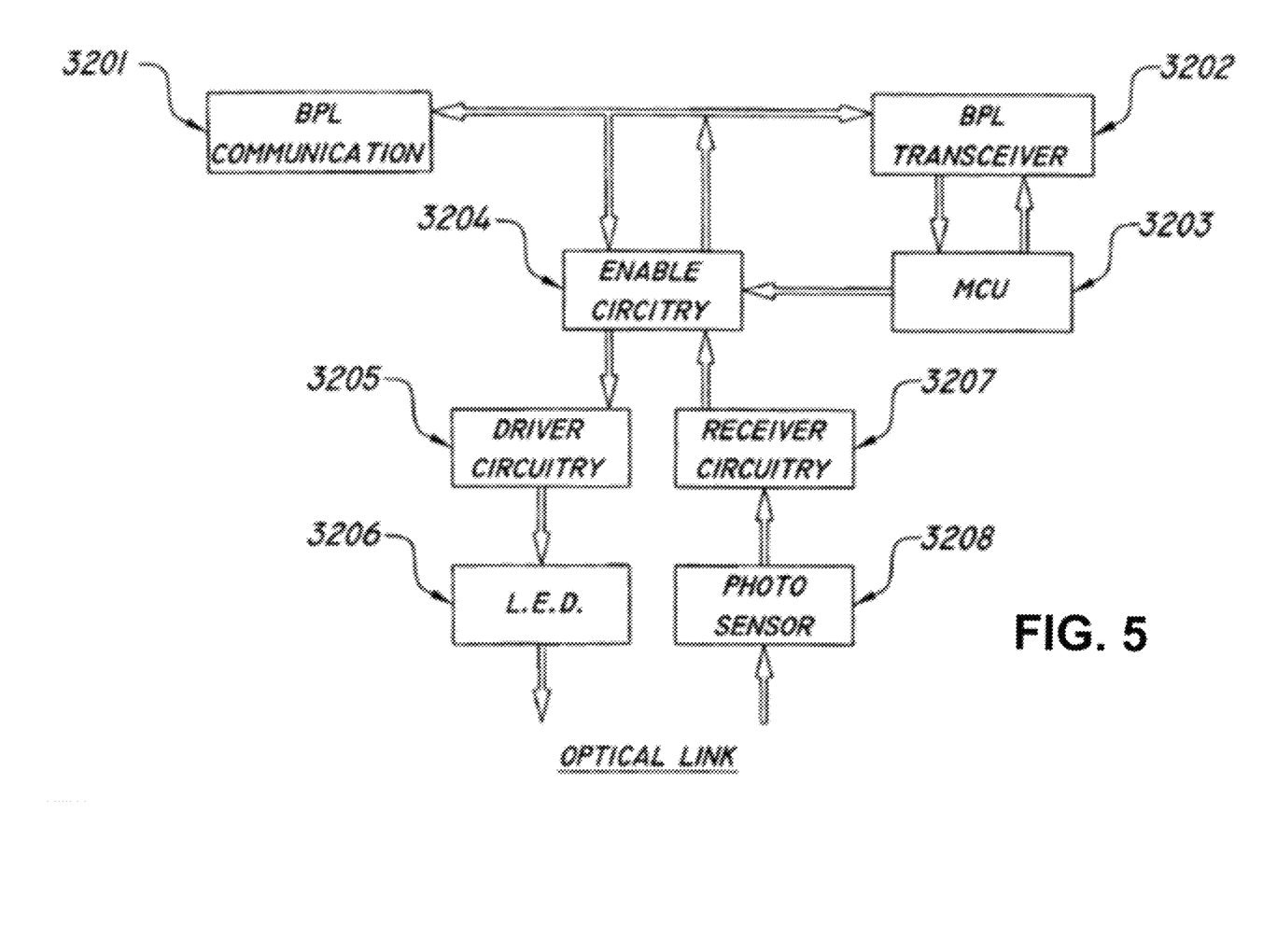
FIG. 5 shows a microcontroller embodiment with data networking links.

FIG. 5 illustrates by block diagram an electrical schematic of a communications network. Incoming/Outgoing BPL communication 3201 is provided through a wire from a remote BPL transceiver. This is the shared electrical circuit. A Broadband-over-Power-Line (BPL) transceiver 3202 is provided to receive and transmit data from/to the BPL enabled electrical circuit. The particular interface implemented may vary. Currently a number of existing interfaces could be used, such as Universal Serial Bus (USB), Ethernet, Media Independent Interface (MII), etc, and the particular choice of interface could further depend on the BPL transceiver used, as will be apparent to those skilled in the art.

A micro-controller, microprocessor, ASIC or the like 3203 is provided for program control that can transmit/receive data to/from BPL communication network 3201 through BPL transceiver 3202. Microprocessor 3203 in an embodiment may respond to commands received on this network 3201 to manipulate enable circuitry 3204, and may also issue commands or send data to network 3201 if needed. If the transmit portion of enable circuitry 3204 is enabled, these commands/data will also be passed to the optical link.

Enable circuitry 3204, through driver circuitry 3205, may in one embodiment be enabled to turn on or off the LED optical transmitters 3102, 3104, as well as change the characteristics of the light, such as brightness and even color mix when multicolor LEDs are used. This is useful for things such as an annunciator light or emergency light, which may provide a visual indicator for things such as tornado, lockdown, fire, movement, etc. Enable circuitry 3204 may also manipulate the ability for BPL communication network 3201 to send and/or receive data at this clock to or from the optical link.

Driver circuitry 3205 and LED(s) 3206 will pass any signals to the optical link for other devices. Driver circuitry 3205 may, in the preferred embodiment, simply be appropriate buffering, isolation, modulation or amplification circuitry which will provide appropriate voltage and power to adequately drive LED emitter 3206 into producing a visible light transmission. Exemplary of common driver circuits are operational amplifiers (Op-amps) and transistor amplifiers, though those skilled in the art of signal conditioning will recognize many optional circuits and components which might optionally be used in conjunction with the present invention. Also, it may be desirable to use a modulation scheme with the signal. The transmit circuitry may have to provide a means of modulation in this case, also preferably incorporated into driver circuitry 3205. The type of modulation will be decided using known considerations at the time of design, selected for exemplary purposes from FM, AM, PPM, PDM, PWM, OFDM, and QAM.

Similar to but preferably complementary with the transmission circuitry, receiver circuitry 3207 receives data from the optical link detected by photo sensor 3208. Receiver circuitry 3207 will appropriately condition, and may further convert a data-bearing electrical signal. As but one example of such conversion, receiver circuitry 3207 may additionally demodulate a data-bearing electrical signal, if the data stream has been modulated by an optical host. Suitable buffering, amplification and other conditioning may be provided to yield a received data signal.

In one embodiment, LED 3206 may be illuminated as a night light at low power. Where properly enabled with battery back-up or the like, the preferred embodiment communications such as illustrated in the Figures may further provide communications and emergency lighting in the event of a power failure.

In an embodiment of the invention, an intelligent audio/visual observation and identification database system may also be coupled to sensors as disposed about a building, relying upon the present communications system transmitting over the synchronization wire of a clock system. The system may then build a database with respect to temperature sensors within specific locations, pressure sensors, motion detectors, communications badges, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors for comparison to the pre-stored or learned data to identify discrepancies therebetween. In addition, filtering, flagging and threshold procedures may be implemented to indicate a threshold discrepancy to signal an officer to initiate an investigation. The reassignment of priorities and the storage and recognition of the assigned priorities occurs at the computer to automatically recalibrate the assignment of points or flags for further comparison to a profile prior to the triggering of a signal representative of a threshold discrepancy.

The intelligent audio/visual observation and identification database system may also be coupled to various infrared or ultraviolet sensors, in addition to the optical sensors incorporated directly into LED optical transmitters and optical detectors, and used for security/surveillance within a structure to assist in the early identification of an unauthorized individual within a security zone or the presence of an intruder without knowledge of the intruder.

The intelligent audio/visual observation and identification database system as coupled to sensors and/or building control systems for a building which may be based upon audio, temperature, motion, pressure, phone number identifiers, smoke detectors, fire detectors and fire alarms is based upon automatic storage, retrieval and comparison of observed/measured data to prerecorded data, in further comparison to the threshold profile parameters to automatically generate a signal to a surveillance, security, or law enforcement officer.

The optical link does not interfere with existing communication systems like those that are common today. Consequently, the preferred embodiment may be used in a variety of applications where prior art systems were simply unable due to EMI/RFI considerations.

Set-up, testing, troubleshooting and the like are also vastly simplified. When the light communication system is working, the user can actually see the illumination. If an object interferes with light transmission, the user will again immediately recognize the same. Thus, the ease and convenience of this light system adds up to greater mobility and less cost. In addition, relatively high energy outputs may be provided where desired using the preferred visible light communications channel, since the human eye is adapted and well-protected against damage from light. In contrast, many invisible transmission techniques such as Ultraviolet (UV) or Infra-Red (IR) systems have much potential for harm.

A host lamp fixture system may replace stationary (mounted in a particular place) lighting fixtures in order to communicate data. Inside of LED lights there may be one or many dies; these may pulsate on slightly different frequencies from a single light to communicate. Each may be looking for changes by way of Multiple Channel Access or other suitable technique.

The LED signal light can provide systematic information transfer through encrypted pulsed light (hereinafter SIT-TEL) communication system which may be depicted in several embodiments. Any reference to a SIT-TEL communication herein is perceived to be equivalent to, and/or the same as, a general reference to pulsed light communication. In general, the signal light and SIT-TEL pulsed light communication system may be formed of a single row, single source, or an array of light emitting diode light sources configured on a light support and in electrical communication with a controller and a power supply, battery, or other electrical source. The signal light and SIT-TEL pulsed light communication system may provide various light signals, colored light signals, or combination or patterns of light signals for use in association with the communication of information. These light signals may also be encoded. Additionally, the signal light and SIT-TEL pulsed light communication system may be capable of displaying symbols, characters, or arrows. Rotating and oscillating light signals may be produced by sequentially illuminating columns of LEDs on a stationary light support in combination with the provision of variable light intensity from the controller. However, the signal light and SIT-TEL pulsed light communication system may also be rotated or oscillated via mechanical means. The signal light and SIT-TEL pulsed light communication system may also be easily transportable and may be conveniently connected to a stand such as a tripod for electrical coupling to a power supply, battery, or other electrical source as a remote stand-alone signaling or communication device.

The signal light and SIT-TEL pulsed light communication system may be electrically coupled to a controller used to modulate, pulse, or encode, the light generated from the light sources to provide for various patterns or types of illumination to transmit messages.

Individual light supports as a portion of the SIT-TEL communication system may be positioned adjacent to, and/or be in electrical communication with another light support, through the use of suitable electrical connections. Alternatively, individual light supports may be in communication with each other exclusively through the transmission and receipt of pulsed light signals.

A plurality of light supports or solitary light sources may be electrically coupled in either a parallel or series manner to a controller. The controller is also preferably in electrical communication with the power supply and the LEDs, to regulate or modulate the light intensity for the LED light sources. The individual LEDs and/or arrays of LEDs may be used for transmission of communication packets formed of light signals.

The controller for the LED light support may generate and/or recognize pulsed light signals used to communicate information. The LED light system may also include a receptor coupled to the controller, where the receptor is constructed and arranged for receipt of pulsed LED light signals for conversion to digital information, and for transfer of the digital information to the controller for analysis and interpretation. The controller may then issue a light signal or other communication signal to an individual to communicate the content of received information transmitted via a pulsed LED light carrier.

In one communications application, two unsynchronized transceivers phase-lock to each other and exchange pulse-width-modulated data bi-directionally. In this protocol, the two receivers take turns to operate in transmit and receive mode, and a relatively short light pulse indicates a 0 or space state, and a relatively long light pulse indicates a 1 or mark state. This protocol starts in an idle cycle with the transceiver performing an idling cycle. In the idle cycle, the transceiver transmits a one millisecond light pulse followed by a four millisecond receive period. During the receive period, the transceiver executes multiple light measurements. These light measurements provide only a one bit of resolution, i.e., whether the incoming light flux is above or below a predetermined threshold, nominally about 1.5V. The idling cycle continues until at least two measurement times in succession indicate "light seen." At this point, the transceiver assumes an incoming pulse of light from another transceiver has been detected, and shifts from the idling loop to a slightly faster synchronizing loop. During the synchronizing loop, the transmitted light pulse is still one millisecond ON, but followed by a variable number of light measurements. When in the synchronizing loop, the microprocessor terminates the measurement set after either a predetermined number of measurements, or when the trailing edge of a light pulse is detected. A trailing edge is considered to be found when a pair of back-to-back measurements both indicate "light seen" followed by ten measurements without "light seen." The execution pattern inside the synchronize loop is therefore composed of one transceiver's LED on for one millisecond, then a one millisecond period with both LEDs off, followed by the other transceiver's LED on for one millisecond, and finally both LEDs off for one millisecond. Even if the transceivers have clock frequency errors of up to 25%, they will still be able to synchronize. The nominal synchronize loop pulse rate is 250 Hz, with a 25% duty cycle. During communication, data bits are transmitted in asynchronous form. For example, a one millisecond light pulse, indicates a MARK and a 0.5 millisecond light pulse indicates a SPACE. The system normally idles with MARK bits being transmitted. Here, the operation of the data transfer loop is the same as the synchronize loop. During data transmission, the format is at least 16 MARK bits to allow synchronization, then a single SPACE as a start bit, followed by eight bits of data, followed by one MARK as a stop bit. This is similar to the common 8-N-1 RS-232 format. To decode the light pulses, the receiving transceiver keeps a count of "light seen" measurements for each execution of the synchronize loop. If seven or fewer light-seen measurements are counted, then a SPACE is recorded; if eight or more pulses are counted, then a MARK is recorded. The usual asynchronous deframing, i.e., dropping the leading SPACE start bit and the trailing MARK stop bit, can be performed. The resulting 8-bit data word is then available to the application-level program. Simple data communications can also be combined with error correction and encryption. Other optical communications protocols are also possible.

In some applications, the peer-to-peer ability to transfer information or authorization is desirable. In other applications, such as financial and other secure transactions, authentication is as important as the data transfer itself, and the uncontrolled passing of authority must be prevented. An unfortunate side effect of the programmable nature of the transceiver is that there is no guarantee that another transceiver will respect any "do not forward" data tags that may be inserted by an application. Non-transferable authorization and unforgeable proof-of-identity are difficult problems with many subtleties. However, simple cryptography is possible and can be used to keep the transceivers transactions secure from eavesdropping and spoofing. The microprocessor used has sufficient power to implement common symmetric cryptographic algorithms. These require the transmitter and receiver to share a secret key so communication between any two transceivers is configured in advance. The transceiver can be equipped with sufficient memory to hold many symmetric encryption keys and can therefore be set up to communicate with a large number of other transceivers. Zero-knowledge proofs (ZKP) and public-key (or asymmetric) cryptography enable the transceiver to securely prove its identity and communicate with any transceiver that had access to published information, see Schneier, "Applied Cryptography," 2nd edition, John Wiley and Sons, New York, N.Y., 1996, pp. 101-111. No shared secrets are necessary.

In one embodiment, each LED in the bulb can have a different color that when combine, can have any color desired. The color of the bulb can be specified using a computer or mobile device such as a phone, or can be programmed in advance depending to the mood of the user as sensed by sensors in the house or sensed from messages and emails recently received by the user.

Although a feature may appear to be described in connection with a particular embodiment, one skilled in the art would recognize that various features of the described embodiments may be combined. Moreover, aspects described in connection with an embodiment may stand alone.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

What is claimed is:

1. A communication system, comprising:
   a light source to generate light and a light connector fitting a fluorescent tube or a light connector fitting an incandescent bulb, wherein the connector provides data communication and operation of the light source, the connector coupled to a wired circuit for communicating with a database for parameters and environmental conditions for predetermined positions or zones of a structure for individual periods of time and dates, wherein the light source is in thermal contact with a cooling surface;
   a broadband light receiver control electronics to demodulate a received light signal from the broadband optical data transmission network; and
   a wired network transceiver coupled to the light transmitter/receiver to receive and transmit data between the optical data transmission network and a wired circuit.

2. The system of claim 1, comprising a light connector fitting a T-5, T-8, or T-12 fluorescent tube or a light connector fitting an incandescent bulb, wherein the connector provides data communication and operation of the light source.

3. The system of claim 1, comprising a HVAC (heating, ventilating, and air conditioning) system coupled to an optical transceiver to communicate operation data over the broadband optical data transmission network.

4. The system of claim 1, wherein the wired circuit comprises at least a Broadband-over-Power-Line (BPL) transceiver.

5. The system of claim 1, comprising an observation and identification database optically coupled to sensors disposed about a building, the database communicating with temperature sensors within specific locations, pressure sensors, motion detectors, communications badges, phone number identifiers, sound transducers, and fire detectors.

6. The system of claim 5, wherein the database captures parameters and environmental conditions for specific zones of a structure for individual periods of time and dates and wherein a processor receives data from remote sensors for comparison to learned data to identify discrepancies.

7. The system of claim 6, comprising security or surveillance module within a structure for identification of an unauthorized individual within a security zone.

8. The system of claim 1, comprising a pulsed light controller coupled to the light source.

9. The system of claim 8, comprising an encryption module coupled to the pulsed light controller to provide secure broadband communication.

10. The system of claim 1, wherein the pulsed light controller generates rotating and oscillating light signals sequentially illuminating columns of LEDs on a stationary light support with a variable light intensity or with a motor.

11. The system of claim 1, comprising a bulb, including:
    a sealed body having an interior chamber with a liquid portion and a vapor or gas portion;
    a boiling enhancement surface positioned in a predetermined location on the interior chamber and thermally coupled to the liquid portion at all orientations of the light blade; and
    a light source thermally coupled to the predetermined location on an exterior portion of the sealed body.

12. The system of claim 1, wherein a light source color is changed to provide a visual indicator for a predetermined event.

13. The system of claim 1, wherein the light source comprises LEDs each with a different color that when combined, have a predetermined bulb color.

14. The system of claim 1, wherein the color of the light source is specified using a computer or mobile device such as a phone, or programmed in advance.

15. The system of claim 1, wherein the bulb color is automatically changed based on a mood of the user as detected by a sensor or sensed from messages and emails recently transmitted by a user.

16. The system of claim 1, comprising a data transceiver coupled to the LED to communicate and/or transfer data over a wired network, optical network, or wireless network.

17. The system of claim 1, comprising monitoring software for optimizing lighting efficiency or predictive maintenance.

* * * * *